United States Patent [19]

Johnson

[11] Patent Number: 5,588,472

[45] Date of Patent: Dec. 31, 1996

[54] METHOD FOR COMBINED GAS FILL AND PROOF TEST OF PRESSURE VESSELS

[75] Inventor: Kelly B. Johnson, Layton, Utah

[73] Assignee: Morton International, Inc., Chicago, Ill.

[21] Appl. No.: 490,185

[22] Filed: Jun. 14, 1995

[51] Int. Cl.$^6$ .................. B65B 1/30; B65B 3/26
[52] U.S. Cl. .................. 141/83; 141/3; 141/20; 141/95; 141/99; 73/49.4; 53/403
[58] Field of Search .................. 141/2–4, 18, 20, 141/47, 49, 54, 82, 83, 95, 99, 197, 25; 73/49.3, 49.4, 37, 865.5; 53/403

[56] References Cited

U.S. PATENT DOCUMENTS

| | | | |
|---|---|---|---|
| 4,002,054 | 1/1977 | Grenci | 73/37 |
| 4,090,394 | 5/1978 | Herman et al. | 73/49.4 |
| 4,577,487 | 3/1986 | Dooley | 73/37 |
| 5,370,159 | 12/1994 | Price | 141/25 |

*Primary Examiner*—Henry J. Recla
*Assistant Examiner*—Timothy L. Maust
*Attorney, Agent, or Firm*—Gerald K. White

[57] ABSTRACT

A method of filling and proof testing pressure vessels, such as hybrid air bag inflators, with gas. A method of filling a pressure vessel where the volume and temperature of the gas going into the vessel are controlled to ensure a consistent fill mass. By setting the controlled temperature high enough to cause this fill pressure to exceed the required proof pressure, the vessel can be sealed immediately after filling and the pressure will decrease as the contents cool. If a required hold time is specified in connection with the proof test, the temperature can be set high enough to allow for cooling of the contents during the hold time. The need for a separate proof test step is eliminated and cycle time is greatly reduced.

12 Claims, 1 Drawing Sheet

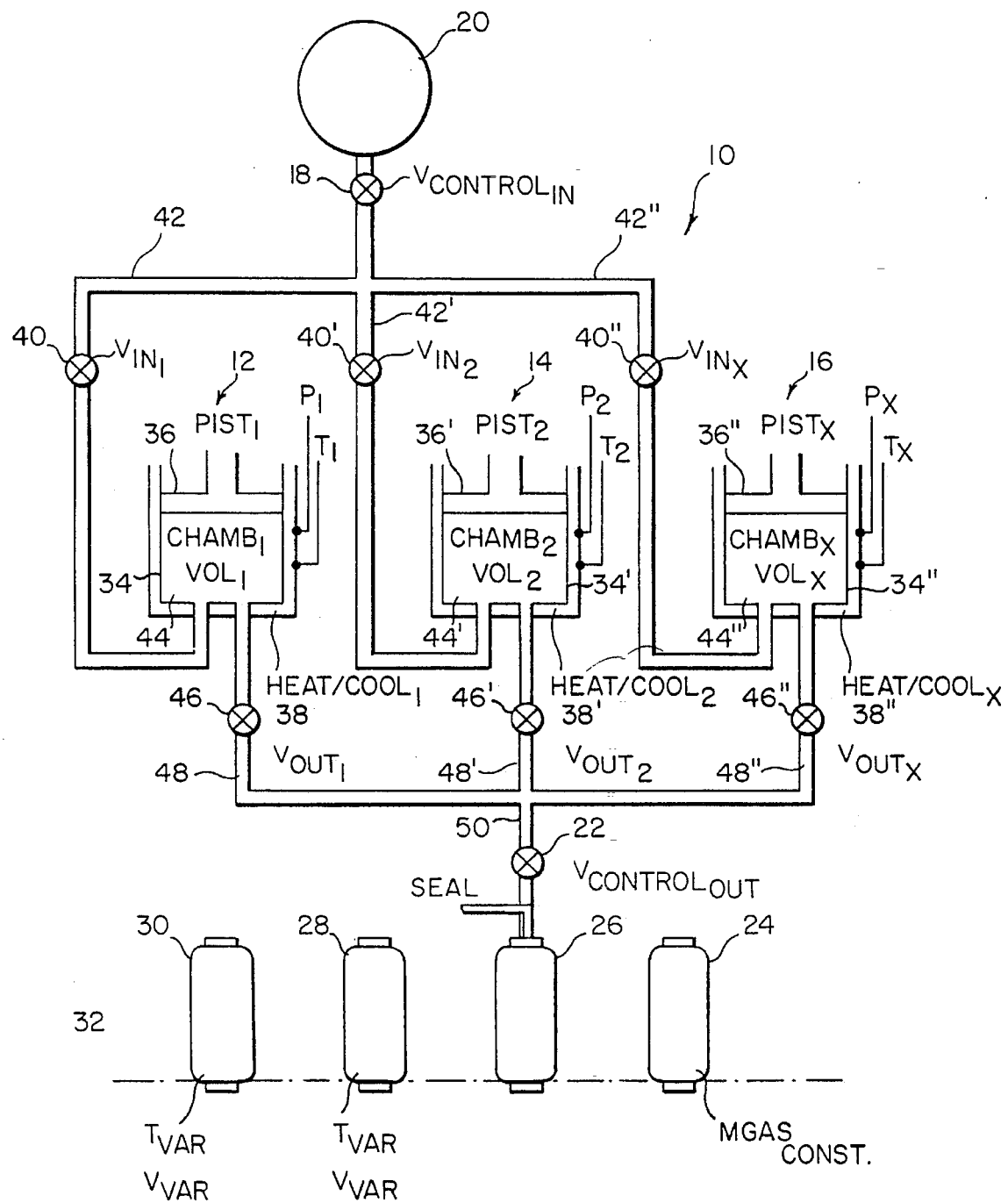

METHOD FOR COMBINED GAS FILL AND PROOF TEST OF PRESSURE VESSELS

BACKGROUND OF THE INVENTION

1. Field of the Invention

This invention relates to filling pressure vessels, particularly hybrid air bag inflators, with gas.

2. The Related Art

Present-day automotive vehicles incorporate one or more inflatable air bags for the protection of occupants in the event of a crash. The air bags are mounted in a folded compact condition in cooperative relation with a gas inflator. Upon sensing an impending vehicle crash, the inflator produces inflation gas which rapidly inflates and deploys the air bag.

Many types of inflators have been disclosed in the art for use in inflating air bags in such crash protection or safety restraint systems. One involves the utilization of a quantity of stored compressed inflation gas which is selectively released to inflate the air bag. Another derives a gas source from a combustible gas generating material which, upon ignition, generates a quantity of gas that is sufficient to inflate the air bag. In a third type, the air bag inflation gas results from a combination of stored compressed gas and gas generating material. The last mentioned type is commonly referred to as an augmented gas or hybrid inflator.

The compressed or pressurized supply of gas is a very important part of a hybrid inflator. The pressurized vessel typically is compressed or pressurized with an inert gas such as argon, or a mixture of argon and another inert gas, to approximately 3000 psi at room temperature. The invention, in general, is applicable to compressed gases. The phrase compressed gases is understood to encompass inert, flammable and non-flammable gases, either existing alone or in certain proportions. The limit of 3000 psi at room temperature is illustrative only and is not intended in any manner to place restrictions on the scope of the claimed invention.

A U.S. Department of Transportation (DOT) requirement on hybrid inflators calls for a proof pressure that exceeds the pressure of the contents at 130° F., with a 30-second hold-time requirement. Current practice for proof testing hybrid inflators requires over-filling the inflator (at room temperature) to the desired proof pressure, then venting the extra gas until the desired fill pressure is reached.

An alternative being considered would separate the proof and fill stages, conducting them at different points on the production line. Both methods require significant time and wasted gases. Neither method proof-tests the ball weld that is used to seal the inflator.

There are two other methods that are commonly used when proof-testing pressure vessels. One method is to conduct the test with a liquid, such as water, as a step separated from the filling process. The other method is to fill and seal the vessel, and then heat the assembly to increase the pressure of the gas. Both methods are time consuming and require a separate production station for the proof test.

There is thus a need and demand for improvement in the techniques that are used when proof testing pressure vessels, and in particular, hybrid inflators in order to reduce the time required to carry out the proof testing process to avoid wasting of gases, and also to proof test the weld that is used to seal the inflator. The present invention was devised to fill the technological gap that has existed in the art in this respect.

A method of filling a pressure vessel with gas is disclosed in application Ser. No. 08/490,186 (Docket 2577-21-00) filed Jun. 14, 1995 in the United States Patent Office by Daniel R. Leininger and Walter A. Moore entitled "High Rate Pressure Vessel Filling Process" and assigned to the assignee of the present invention. A characteristic of this method is that the volume and temperature of the gas going into the vessel are controlled to ensure a consistent fill mass.

The present invention devises on the Leininger and Moore method by setting the controlled temperature high enough to cause the fill pressure to exceed the required proof pressure. The vessel can be sealed immediately after filling, and the pressure will decrease as the contents cool. If a required hold time is specified in connection with the proof test, the temperature can be set high enough to allow for cooling of the contents during the hold time. This method eliminates the need for a separate proof test step and greatly reduces cycle time.

SUMMARY OF THE INVENTION

An object of the invention is to provide a method of filling a pressure vessel where the volume and temperature of the gas going into the vessel are controlled to ensure a consistent gas fill mass, wherein the controlled temperature is set high enough to cause the fill pressure to exceed a required vessel proof pressure, and wherein the vessel is sealed immediately after filling to allow for cooling of the contents during a required hold time.

This and other objectives of the invention are accomplished by filling a desired mass of gas into a cylinder, more specifically controlling/monitoring the gas temperature in the cylinder and then filling the cylinder to the appropriate pressure relating to the temperature through the perfect gas law:

$$PV = nRT$$

where
P—pressure
V—volume
n—number of moles of gas
R—universal gas constant
T—temperature The number of moles of gas required to meet the mass target is determined by the following relationship:

$$n = \frac{m}{MW}$$

where
m—target gas mass
MW—molecular weight of the gas

The perfect gas law can then be rearranged to yield the following relationship:

$$P = \frac{mRT}{MWV}$$

Using this relationship, the pressure can be adjusted based on the measured temperature to achieve the desired gas mass.

By setting the controlled temperature at an elevated level, the pressure vessel will be filled to a pressure higher than the room-temperature storage pressure. Through appropriate temperature control, the pressure can be high enough to accomplish the proof test upon filling, eliminating the need for a separate step. The vessel can be sealed and allowed to cool, with the contents slowly coming to the lower storage pressure. This allows the sealing mechanism to be proof-tested, as well.

The controlled temperature can be set high enough to allow for the heat transfer between the gas and the pressure vessel body; it can also allow for heat losses during a required holding period, if desired. This allows the pressure vessel to be removed from the fill station immediately after it has been sealed, greatly reducing cycle time, and the number of stations required on a production line.

The various features of novelty which characterize the invention are pointed out with particularity in the claims annexed to and forming a part of this specification. For a better understanding of the invention, its operating advantages and specific objects attained by its use, reference is made to the accompanying drawing and descriptive matter in which a preferred embodiment of the invention is illustrated.

BRIEF DESCRIPTION OF THE DRAWING

With this description of the invention, a detailed description follows with reference to the accompanying drawing which forms part of the specification, and which illustrates a high rate pressure vessel gas filling station according to the invention.

DESCRIPTION OF THE PREFERRED EMBODIMENT

The high rate pressure vessel gas filling station shown in the drawing and designated by reference numeral 10 includes a plurality of prefilling piston cylinder assemblies 12, 14 and 16. A control valve 18 controls the flow of gas from a source 20 to the filling station 10, and a control valve 22 controls the flow of gas from the filling station 10 to a procession of pressure vessels 24, 26, 28 and 30 that are moved along a production line 32 to and beyond the gas filling station 10.

The pressure vessels 24, 26, 28 and 30 may comprise hybrid or stored gas air bag inflators. With this being the case, the source 20 of gas controlled by valve 18 would comprise a compressed, typically at a pressure of about 3000 pounds per square inch (psi).

The piston/cylinder prefilling assembly 12 includes a cylinder 34, a piston 36 that is positioned in sliding pumping cooperative relation within the cylinder 34 and a heating and cooling jacket 38 surrounding the cylinder 34 and within which the cylinder 34 is positioned in close cooperative temperature monitoring and controlling relationship. A control valve 40 controls the flow of gas through a conduit 42 from the control valve 18 to chamber 44 within the cylinder 34. The chamber 44 has a known set volume depending upon the initial position, as shown, of the piston 36 within the cylinder 34.

A control valve 46 controls the flow of gas through a conduit 48 from the chamber 44 to the control valve 22 which controls the flow of gas through a conduit 50 to the pressure vessels 24, 26, 28 and 30 as they are moved successively on the production line 32 in operative filling relation with the prefilling station 10. Measurement of the temperature T1 of the temperature of the cylinder 34 and thereby of the gas within chamber 44 is measured by suitable temperature measuring means (not shown), but which, typically, may comprise commercially available multiple thermocouples. Similarly, measurement of the pressure P1 at which the gas is retained in the chamber 44 is measured by means of suitable pressure measuring means (not shown).

The same reference numbers or letters that are applied in the description of the piston/cylinder prefilling assembly 12 are used in referring to the same elements embodied in the prefilling assemblies 14 and 16 except for the addition of a quotation mark (an inverted comma) to each of the reference numbers or letters that refer to the assembly 14, and the addition of two quotation marks to each of the reference numbers or letters that refer to the assembly 16.

A feature of the pressure vessel gas filling station 10 is that the volume V, V' and V" of each of the chambers 44, 44' and 44" of the respective prefilling assemblies 12, 14 and 16 is set at a constant value. This allows the production of the required gas mass to be accomplished in the chamber 44 of the prefilling assembly 12 by measuring the pressure P therein and correlating it through a feedback system to the chamber 44 temperature control heating and cooling jacket 38, temperature measurement T1 and the set point volume V. Feedback, as those skilled in the art landerstand, is the return of part of the output of a system into the input for purposes of modification and control of the output. This correlated feedback accurately establishes a gas mass in the chamber 44 of the piston/cylinder assembly 12 by the flow of gas thereto through control valves 18 and 40. Each piston is calibrated individually to account for differences in volume due to different fill path lengths. Once the required gas mass is accurately established in the chamber 44, it is rapidly forced into the pressure vessel 26 through gas-out control valves 46 and 22 by movement of the piston 36 in the cylinder 34. The pressure vessel 26 is then immediately sealed.

This results in the pressure vessel 26 being filled with an accurate gas mass regardless of the temperature or volume thereof due to the mass accuracy coming out of the piston/cylinder assembly 12.

Since high rate gas filling effects will create a temperature transient in the piston/cylinder assembly arrangement 12, impacting the ability to accurately determine the pressure from temperature and volume data and thus gas mass in the piston/cylinder arrangement, the gas must be introduced slowly into the prefilling assembly 12. To achieve a short vessel fill cycle time, multiple piston/cylinder assemblies 12, 14 and 16 and additional such assemblies, as required, could be used in the filling machine at the gas filling station 10. The piston/cylinder assembly arrangements allow different initial volumes to be set to achieve various gas fill masses. The temperatures of the cylinders 34, 34' and 34", etc. can be accurately determined through multiple thermocouples, which is not easily done with the pressure vessels 24, 26, 28 and 30 being filled, or can be controlled by a respectively associated heating/cooling jacket 38, 38' and 38".

Thus, there has been provided a method of filling a pressure vessel where the volume and temperature of gas going into the vessel are controlled to ensure a consistent gas fill mass regardless of the temperature or volume of the vessel being filled. There has also been provided accurate temperature measurements and control of gas along with accurate volume setting to correlate with pressure and thereby establish gas mass. This enables more repeatable gas fill weights for hybrid air bag inflators.

The present invention builds on the method described where the volume and temperature of the gas going into the vessel or hybrid inflator are controlled to ensure a consistent gas fill mass. This is done by setting the controlled temperature high enough to cause the fill pressure of the hybrid inflator to exceed a required proof pressure. The hybrid inflator can be sealed immediately after being filled, and the pressure therein will decrease as the contents cool. If a required hold time is specified in connection with a proof test, the temperature can be set high enough to allow for cooling of the contents during the hold time. This method eliminates the need for a separate proof test and greatly reduces cycle time.

With this description of the invention in detail, those skilled in the art will appreciate that modifications may be made to the invention without departing from the spirit thereof. Therefore, it is not intended that the scope of the invention be limited to the specific embodiment that has been illustrated and described. Rather it is intended that the scope of the invention be determined by the scope of the appended claims.

What is claimed is:

1. A method of gas filling and pressure proof testing a pressure vessel comprising the steps of:
   (a) controlling the volume and temperature of the gas going into the pressure vessel to ensure a consistent gas fill mass,
   (b) setting the controlled temperature of the gas high enough to cause the fill pressure of the vessel to exceed the required proof pressure of the vessel, and
   (c) rapidly discharging the gas fill mass into the pressure vessel and immediately sealing the vessel after filling and allowing the pressure to decrease as the gas fill mass cools.

2. A method, as defined by claim 1, wherein, if a required hold time is specified in connection with the proof test, in step (b) the temperature of the gas is set high enough to allow for cooling of the gas fill mass of the vessel during the hold time.

3. A method of filling and proof testing a pressure vessel with a required gas mass comprising,
   (a) flowing gas from a source thereof into a chamber having a set volume V,
   (b) measuring the temperature of the gas in the chamber,
   (c) controlling the temperature of the gas in the chamber,
   (d) measuring the pressure of the gas in the chamber,
   (e) utilizing the relationship $$P = \frac{mRT}{MWV},$$

where P is the pressure of the gas in the chamber, m is the target gas mass, MW is the molecular weight of the gas, V is the volume of the chamber, R is the universal gas constant, and T is the temperature of the gas in the chamber,
   correlating the measured pressure P through a feedback system to a chamber temperature control heating and cooling jacket, the temperature measurement T, and the set volume V of the chamber to establish a required gas mass in the chamber by the flow of gas thereinto,
   (f) once the required gas mass is accurately established in the chamber, setting the temperature of the gas in the chamber high enough to cause the pressure therein to exceed the required proof pressure, and then rapidly discharging the heated gas mass in the chamber into the pressure vessel, and
   (g) immediately sealing the pressure vessel after filling and allowing the pressure therein to decrease as the gas fill mass cools.

4. A method of filling a pressure vessel as defined by claim 1 wherein the pressure vessel to be filled and proof tested is a hybrid inflator.

5. A method of filling and proof testing a pressure vessel, as defined by claim 4, wherein the gas being filled in the hybrid inflator is compressed gas.

6. A method of filling and proof testing a pressure vessel, as defined by claim 5, wherein the compressed gas being filled in the hybrid inflator is argon or a mixture of argon and other gases.

7. A method, as defined by claim 3, wherein, if a required hold time is specified in connection with the proof test in step (f) the temperature of the gas mass is set high enough to allow for a cooling thereof during the hold time.

8. A method of filling and proof testing a pressure vessel with a required gas mass comprising,
   (a) slowly prefilling a temperature monitored and controlled constant volume cylinder assembly to ensure a consistent gas fill mass,
   (b) setting the temperature of the gas high enough to cause the fill pressure of the vessel to exceed the required proof pressure of the vessel,
   (c) rapidly discharging the heated gas fill mass into the pressure vessel, and
   (d) immediately sealing the pressure vessel after the gas fill mass is discharged into the pressure vessel and allowing the pressure thereof to decrease as the gas fill mass cools.

9. A method, as defined by claim 8,
   (e) wherein to achieve a short pressure vessel fill time, multiple constant volume cylinder assemblies are used to ensure the production of a plurality of consistent gas fill masses.

10. A method, as defined by claim 8,
    wherein, in step (a), the temperature monitored and controlled constant volume cylinder assembly comprises a piston/cylinder assembly with the temperature of the cylinder accurately controlled by a surrounding HEAT/COOL jacket and monitored, and the initial position of the piston in the cylinder determines the constant volume of the chamber within the cylinder, which allows the required gas mass to be achieved in the cylinder chamber by measuring the pressure therein and correlating it through a feedback system to the chamber temperature control, temperature measurement and the set cylinder chamber volume.

11. A method, as defined by claim 10,
    wherein, in step (a), the correlated feedback controls by the adjustment of gas-in valves the flow of gas mass into the constant volume chamber of the piston/cylinder assembly from a suitable gas source,
    whereby, once accurately established in the constant volume chamber of the cylinder assembly, the gas mass is forced into the pressure vessel through gas-out controlling valves by the piston.

12. A method, as defined by claim 8, wherein if a required hold time is specified in connection with the proof test, in step (b) the temperature of the gas fill mass is set high enough to allow for cooling of the gas fill mass of the pressure vessel during the hold time.

* * * * *

UNITED STATES PATENT AND TRADEMARK OFFICE
CERTIFICATE OF CORRECTION

PATENT NO. : 5,588,472
DATED : 31 December 1996
INVENTOR(S) : Kelly B. Johnson

It is certified that error appears in the above-indentified patent and that said Letters Patent is hereby corrected as shown below:

At column 4, line 21, "landerstand" should be --understand--.

Signed and Sealed this

Sixteenth Day of September, 1997

Attest:

BRUCE LEHMAN

Attesting Officer

Commissioner of Patents and Trademarks